United States Patent
McNamee et al.

(10) Patent No.: US 10,844,931 B2
(45) Date of Patent: Nov. 24, 2020

(54) SYNCHRONOUS BELT WITH UNIDIRECTIONAL FABRIC REINFORCEMENT

(71) Applicant: GATES CORPORATION, Denver, CO (US)

(72) Inventors: Patrick Joseph McNamee, Monument, CO (US); Kelechi C. Anyaogu, Sterling Heights, MI (US)

(73) Assignee: Gates Corporation, Denver, CO (US)

( * ) Notice: Subject to any disclaimer, the term of this patent is extended or adjusted under 35 U.S.C. 154(b) by 287 days.

(21) Appl. No.: 15/965,470

(22) Filed: Apr. 27, 2018

(65) Prior Publication Data

US 2018/0313431 A1  Nov. 1, 2018

Related U.S. Application Data

(60) Provisional application No. 62/490,956, filed on Apr. 27, 2017.

(51) Int. Cl.

| | |
|---|---|
| *F16G 3/10* | (2006.01) |
| *F16G 1/04* | (2006.01) |
| *F16G 1/10* | (2006.01) |
| *B29D 29/08* | (2006.01) |
| *F16G 1/28* | (2006.01) |
| *F16G 5/20* | (2006.01) |

(52) U.S. Cl.
CPC ............. *F16G 3/10* (2013.01); *B29D 29/08* (2013.01); *F16G 1/04* (2013.01); *F16G 1/10* (2013.01); *F16G 1/28* (2013.01); *F16G 5/20* (2013.01)

(58) Field of Classification Search
CPC ......... F16G 1/28; C08L 15/005; B29D 29/08; C08K 5/098; D07B 2801/10
USPC .......................................................... 474/205
See application file for complete search history.

(56) References Cited

U.S. PATENT DOCUMENTS

| | | | | |
|---|---|---|---|---|
| 3,250,653 | A | * 5/1966 | Geist ........................ | F16G 1/28 156/138 |
| 3,973,894 | A | * 8/1976 | Lindner ................ | B29D 29/08 425/370 |
| 4,235,119 | A | * 11/1980 | Wetzel .................. | B29D 29/08 474/205 |

(Continued)

FOREIGN PATENT DOCUMENTS

| | | |
|---|---|---|
| EP | 1081412 B1 | 10/2004 |
| JP | 03265739 A | 11/1991 |

(Continued)

OTHER PUBLICATIONS

European Patent Office; International Search Report and Written Opinion of the International Searching Authority; International application No. PCT/US2018/029941; dated Sep. 19, 2018;.

(Continued)

*Primary Examiner* — Henry Y Liu
(74) *Attorney, Agent, or Firm* — Paul N. Dunlap, Esq.

(57) ABSTRACT

A synchronous belt having a tensile member layer with a tensile member embedded in an elastomeric body, a toothed surface with a plurality of regularly spaced, transverse teeth protruding from the body, a jacket covering the toothed surface, and a unidirectional fabric layer suspended in the belt between the jacket and the tensile member layer and following the approximate contour of the jacket.

7 Claims, 1 Drawing Sheet

(56) References Cited

U.S. PATENT DOCUMENTS

| | | | | |
|---|---|---|---|---|
| 4,392,842 A * | 7/1983 | Skura | F16G 1/28 | 474/205 |
| 4,632,665 A * | 12/1986 | Skura | B29D 29/08 | 474/205 |
| 5,053,246 A * | 10/1991 | Shuttleworth | B29B 15/08 | 427/538 |
| 5,362,281 A * | 11/1994 | Dutton | F16G 1/28 | 474/205 |
| 5,971,879 A * | 10/1999 | Westhoff | B32B 5/26 | 474/260 |
| 6,028,016 A * | 2/2000 | Yahiaoui | A61F 13/8405 | 442/118 |
| 6,296,588 B1 * | 10/2001 | Ciemniecki | B29D 29/08 | 474/268 |
| 6,406,397 B1 * | 6/2002 | Isshiki | B29D 29/08 | 474/205 |
| 6,419,775 B1 * | 7/2002 | Gibson | F16G 1/28 | 156/137 |
| 7,749,118 B2 * | 7/2010 | Baldovino | F16G 1/28 | 474/205 |
| 7,909,720 B2 * | 3/2011 | Burrowes | F16G 1/28 | 474/205 |
| 8,142,316 B2 * | 3/2012 | Goettsch | F16G 5/20 | 474/205 |
| 8,357,065 B2 * | 1/2013 | Duke, Jr. | B29D 29/08 | 474/205 |
| 8,859,081 B2 * | 10/2014 | Baldovino | B23B 3/30 | 428/163 |
| 9,353,827 B2 * | 5/2016 | Uchigashima | F16G 1/28 | |
| 10,012,291 B2 * | 7/2018 | Speer | F16G 1/28 | |
| 10,514,083 B2 * | 12/2019 | Gregg | F16G 1/10 | |
| 2005/0009428 A1 * | 1/2005 | Porter | B32B 37/24 | 442/129 |
| 2009/0227406 A1 * | 9/2009 | Wu | C08G 18/12 | 474/238 |
| 2013/0034718 A1 * | 2/2013 | Nair | B32B 27/34 | 428/297.4 |
| 2014/0150398 A1 * | 6/2014 | Onbilger | B60C 19/002 | 57/210 |
| 2014/0235393 A1 * | 8/2014 | Sakanaka | F16G 5/166 | 474/263 |
| 2015/0137410 A1 * | 5/2015 | Nair | B60C 9/1821 | 264/103 |
| 2015/0152590 A1 * | 6/2015 | Knox | F16G 1/10 | 428/36.92 |
| 2015/0285334 A1 * | 10/2015 | Thomas | F16G 1/10 | 474/90 |
| 2016/0208889 A1 * | 7/2016 | Yoshida | C08L 15/005 | |
| 2017/0043979 A1 * | 2/2017 | Kucharczyk | B66B 7/062 | |

FOREIGN PATENT DOCUMENTS

| | | |
|---|---|---|
| JP | 2010196889 A | 9/2010 |
| WO | 2017012802 A1 | 1/2017 |

OTHER PUBLICATIONS

Calfee Design, "Technical White Paper," available at http://calfeedesign.com/tech-papers/technical-white-paper/, last accessed Feb. 6, 2017.

* cited by examiner

U.S. Patent  Nov. 24, 2020  US 10,844,931 B2 ered as a basis for modifying or designing other structures for carrying out the same purposes of the present invention. It should
SYNCHRONOUS BELT WITH UNIDIRECTIONAL FABRIC REINFORCEMENT

BACKGROUND OF THE INVENTION

This invention relates generally to a synchronous belt construction, more particularly to a synchronous belt with a layer of unidirectional fabric embedded therein to reinforce the teeth.

Synchronous belts, also called toothed belts, timing belts, and positive drive belts, are widely used for mechanical power transmission and synchronization. For example, they are used in automotive valve timing systems, business machines, bicycle and motorcycle drives, and many other applications. In many such applications, it would be advantageous to improve the load capacity of the belt or to reduce the required width of the belt or both. One factor in load capacity is tooth stiffness. The art discloses many approaches to increasing tooth stiffness.

Some prior belt design approaches include selecting a higher modulus rubber compound to increase the stiffness of the tooth under load, for example by incorporating short fibers or certain fillers. This approach may be limited by the high strain or stress concentrations that can occur in the tooth and which can ultimately lead to teeth shearing from the belt.

U.S. Pat. No. 4,632,665 discloses a belt with a layer of fabric reinforcement in the body of each tooth, separated from the usual outer tooth covering fabric by a cushion layer of rubber. Both fabrics extend around the entire belt and thus, both fabrics support the cord in the land region, contributing to the location of the pitch line. Both the fabrics disclosed are preferably a balanced cloth fabric of nylon 6-6, preferably bias cut so that the warp and the weft yarns each make an angle of between 30 and 60 degrees with respect to the longitudinal axis of the belt. One difficulty with this approach is that both fabric layers present in the land region affect the pitch line of the belt, placing a practical limit on the fabric properties. In manufacturing the belt, the two layers of fabric and the cushion rubber are laid in a mold and preformed into the general shape of the teeth before the tensile member and additional rubber are applied. This is the so-called "preform" method.

What is needed is a method and belt design that gives greater flexibility with respect to material choices and the potential of greater belt performance.

SUMMARY

The present invention is directed to systems and methods which provide timing belts with reinforced teeth. With the reinforced teeth according to the invention, the transfer of tooth loads to the tensile cord may be improved resulting in increased load capacity or belt strength, or reduced tendency for tooth shear failures, or reduced timing error or backlash, or the belt may be sized narrower or smaller and still carry the same load. The effect on pitch line or cord position may be minimized.

The invention relates to a synchronous belt with a tensile member layer having a tensile member embedded in an elastomeric body; a toothed surface with a plurality of regularly spaced, transverse teeth protruding from the body; and a jacket covering the toothed surface; wherein at least one reinforcing fabric layer of unidirectional fabric is located between the tensile member and the jacket and extends around the entire circumference of the belt, following within the teeth the approximate contour or shape of the tooth with unidirectional fibers oriented generally in the longitudinal direction of the belt. The unidirectional fabric layer may be of carbon fiber. The thickness may be much less than required for a woven fabric of similar strength, resulting in minimal shifting of the pitch line of the belt. The reinforcing fabric layer may have unidirectionally oriented carbon fibers in the longitudinal direction of the belt and may have other fibers woven in the transverse direction of the belt. More than one layer of the reinforcing fabric may be present in the belt.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
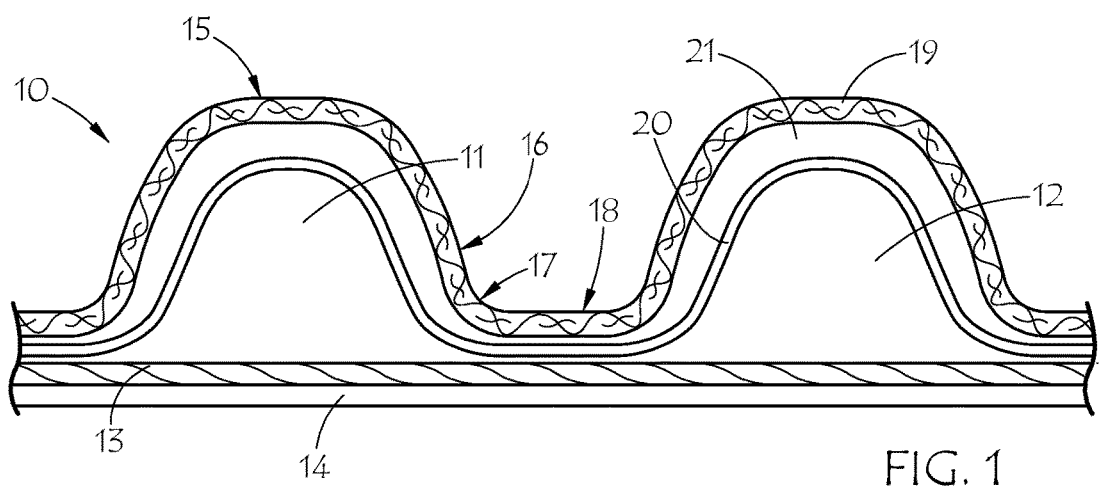
FIG. 1 is a partially fragmented perspective view of an embodiment of the invention.

FIG. 1 illustrates an embodiment of the invention. In FIG. 1, synchronous belt 10 includes teeth 11 comprising tooth rubber 12 arranged on one side of a layer of tensile cord 13. The other side of the belt (opposite the toothed side) is back-side 14 comprising a back-rubber composition. The toothed surface or profile includes tooth tip 15, tooth flank 16, tooth root 17 and land region 18. The rubber of the teeth, back side, and the tensile member layer in which the cord 13 may be embedded, may be different from each other or may be similar or the same. The teeth 11 are covered with tooth jacket 19, which may include a fabric and one or more of various treatments. According to an embodiment of the invention, teeth 11 are stiffened by including an embedded layer of unidirectional filaments, i.e., unidirectional fabric 20. Fabric 20 may also include various treatments, for example to promote penetration by or adhesion to the tooth rubber, cord or jacket, or to facilitate handling. Unidirectional fabric 20 may be separated from jacket 19 by a layer of cushion rubber 21 or other elastomeric material, which may be the same or similar or different to tooth rubber 12. The cushion rubber layer 21 may vary in thickness, for example being very thin in land region 18 and thicker in the vicinity of tooth tip 15, or tooth flank 16. The unidirectional fabric and cushion layer follow generally the contour or profile of the tooth.

Figure 2:
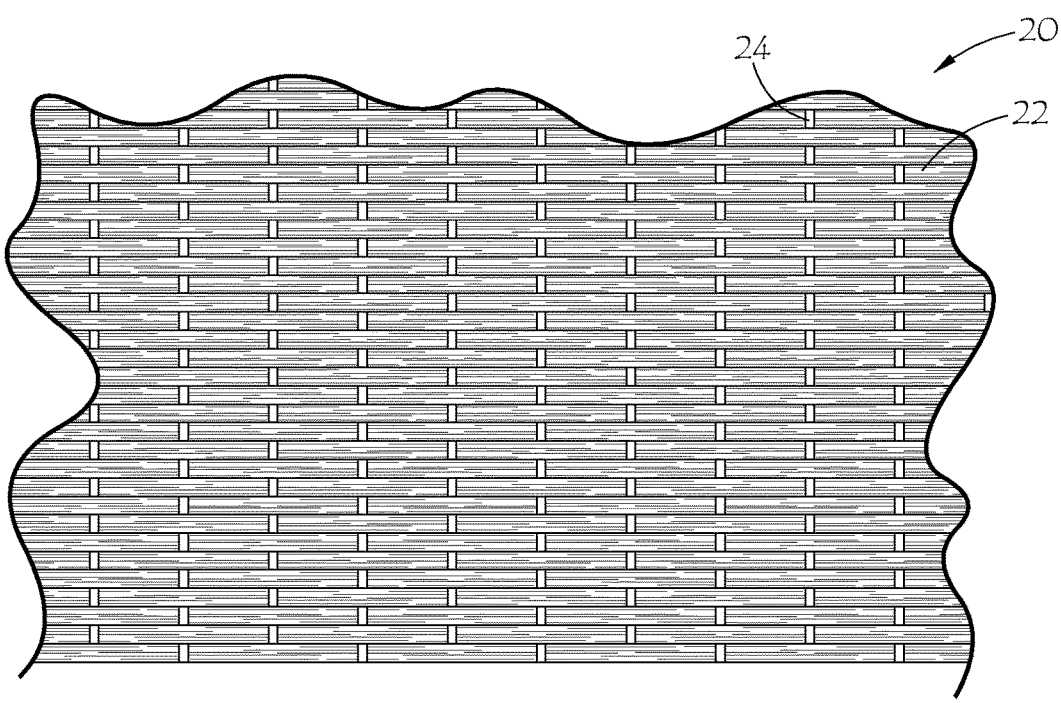
FIG. 2 is a unidirectional fabric useful in the invention.

FIG. 2 illustrates a unidirectional fabric 20 comprising many aligned filaments 22, which may be held together for handling purposes by transverse stitching, binding, or threads 24. The advantages of using unidirectional fabric include maximizing strength in a desired direction with a minimal thickness of material, which in turn retains maximum flexibility. The fabric may be any suitable fiber type which provides high strength and flexibility, such as carbon fiber, aramid, glass, polybenzobisoxazole ("PBO"), polyester, and the like. Preferably the unidirectional fiber is glass or aramid, and most preferably carbon fiber. The binding or threads may be a thermoplastic binder, such as a thin strip of hot-melt material.

The unidirectional fabric may be treated with a finish or size or binder, typically from the manufacturer. Preferably a light finish or size is applied to enhance compatibility with the tooth rubber material, or with a subsequent adhesive treatment if used. Commercially available carbon fiber fabric may be sized to be compatible with epoxy, vinyl ester, or polyester resins for use in structural composites. Often the same sizes must be used here but with an adhesive treatment to enhance compatibility between the fiber, or its size, and the tooth rubber. Adhesive treatments may include elastomeric materials including latex, aqueous and/or solvent-based rubber treatments. The adhesive treatment may include a curative or be a crosslinked or thermoset material. Examples include resorcinol-formaldehyde-latex adhesives ("RFLs"), functionalized polybutadienes, primers, and over-coats/cements. The latex of the RFL may include, but is not limited to, nitrile-butadiene ("NBR"), hydrogenated-NBR ("HNBR"), ethylene elastomers such as EPM and EPDM, CSM, and VPSBR. Types of primers and overcoats include isocyanate, epoxy, urethane, CSM, and others. Treatment of the fabrics may be accomplished by spraying, brushing, roll or knife coating, or dipping methods. Other methods (e.g. chemical vapor deposition, plasma treatments, and surface activation) that introduce charged, polar or non-polar functional groups to the carbon fabric surface may also be applicable.

The adhesive material may be applied on greige (untreated) fabric for providing adhesion to rubber or other elastomer compositions. A lab adhesion study done with unidirectional carbon fiber fabric showed good adhesion of HNBR RFL with a Cilbond 81 overcoat to HNBR rubber. Besides providing maximum unidirectional reinforcement, unidirectional fabric provides maximum exposed surface area of the fiber for easier penetration of adhesive or tooth material and better mechanical and/or chemical bonding.

Suitable adhesive treatments may include those used for carbon fiber tensile cords in rubber applications, such as a rubber cement, polyurea or polyurethane, RFL or other latex-based treatment. Fabrics loaded with commercial binders intended for the structural composites industry are generally not preferred for this application because of the resulting handling stiffness, lack of compatibility with the tooth rubber, and possible strength loss from treating.

A preferred treatment is disclosed in co-pending U.S. patent application Ser. No. 15/348,712, which is hereby incorporated herein by reference in its entirety. That application discloses an aqueous adhesive composition for treating a reinforcing fiber for bonding to a thermosetting polymeric matrix. The adhesive composition includes: water as the solvent or dispersing medium; a polyelectrolyte co-curable with the polymer matrix; a primer material compatible with the fiber and co-curable with the polyelectrolyte; and optionally a rubber curative compatible with the polyelectrolyte and the polymer matrix.

Examples of suitable polyelectrolytes include: maleated polybutadienes or styrene-butadiene copolymers, sulfonated polystyrene or polybutadiene or styrene-butadiene copolymers, maleated ethylene-alpha-olefin-elastomers, and the like. "Maleated" herein means the polymer is grafted with maleic acid (i.e. "maleic-acid-grafted") (or grafted with maleic anhydride and then hydrolyzed to the di-acid) and then neutralized with a base such as NaOH, $NH_4OH$, KOH, etc. "Carboxylated" herein means the polymer is grafted with a carboxylic acid and then neutralized. Likewise, "sulfonated" herein means the polymer is grafted with a sulfonic acid and then at least partially neutralized. Thus, the anionic, organic-acid groups may be neutralized with alkaline, alkaline earth or transition metal cations, including for example zinc, sodium, aluminum, calcium, copper, iron, magnesium, potassium, lithium, etc. Other ionic groups that may be used include thioglycolate or phosphonate, and cationomers, e.g. containing quaternary ammonium groups. "Grafted" may be achieved by a grafting reaction that attaches the functional group to the polymer, or by copolymerization with a functional monomer. Preferred polyelectrolytes are water soluble, or at least easily water dispersible at levels up to about 30% by weight. The "maleate" (MA) content by weight may be in the range 1 to 30%; the number of MA groups per chain between 1-20 groups per chain. Polyelectrolytes with less than about 15 mole % ionic groups per chain are often categorized as "ionomers." Herein, polyelectrolytes are understood to include ionomers. The preferred polyelectrolytes may have 1 to 15 mole % ionic groups per chain, or from 5 mole % to 15 mole %. Molecular weight of the maleated polymer may preferably be between 3000 and 6000 Mn, and it may contain vinyl groups at content between 10-35%, preferably around 28% by weight. The solids content of the maleated polymer material in the aqueous adhesive formulation may be between 20-40% by weight, and the adhesive formulation may have pH between 4.0 and 12.0, preferably around about 8.0 to about 9.0; and viscosity at room temperature less than about 1000 cps. The maleated polymer may also come blended with or without surfactants to enhance the stability of a dispersion, which may have solid particles which are typically less than 500 nm in size. In such a case, the aqueous polyelectrolyte formulation may be considered to be an ionic latex (or ionomeric latex).

The primer material is a chemical or mixture of chemicals with known affinity for the fiber surface and reactive with the polyelectrolyte. For example, epoxy primer materials that are water soluble are generally preferred for use with carbon, glass fibers, etc., as sizing or finish on the fiber surface. Such epoxy primer material may primarily be prepared from or formulated based on epoxy type resins, such as glycidylamine type, novolak, cresol novolak, bisphenol A, F, and S, brominated bisphenol A, urethane-functionalized bisphenol A type resins, and others. Other primer material examples include water soluble or dispersible polyurethanes, polyvinyl alcohol, polyamides (e.g. nylon dispersion), polyethylene, silanes, polypropylene, vinyl acrylic acid copolymers, etc. The primer materials may be further functionalized with groups that facilitate affinity with fiber surface or that aid dispersion in water.

In embodiments of the invention, primer materials can include anionic and cationic surfactants, monomers or polymers with glass transition less than 120° C. and may have solid content<60%, viscosity<5000 cps, and pH between 2-12. The anionic-based primer materials may have groups such as sulfates, sulfonates, phosphates, carboxylates, etc. in their molecular structure. The cationic ones may include those based on primary, secondary, or tertiary amines, and quaternary ammonium groups.

Curative means a reactive material which forms or facilitates the formation of crosslinks between polymer molecules in a thermosetting polymer matrix. Crosslinking of the adhesive composition can be realized by peroxide cure, sulfur cure, thermal, or photo-irradiation processes and systems that may trigger generation of reactive intermediates, which may include, radicals, radical cations/anions which can cause polymerization of the adhesive composition and cross-linking to the thermosetting matrix, which may be, e.g., rubber or other elastomer or polymer. The curative may be sulfur, sulfur accelerators, peroxides, zinc oxide, bismaleimide, diamines, isocyanates, etc.

In one preferred embodiment, the adhesive is an aqueous adhesive composition including water, an epoxy resin as the primer (preferably an epoxy aqueous dispersion or solution), a maleated polybutadiene derivative as the polyelectrolyte, and a curative such as a peroxide curative.

Figure 3:
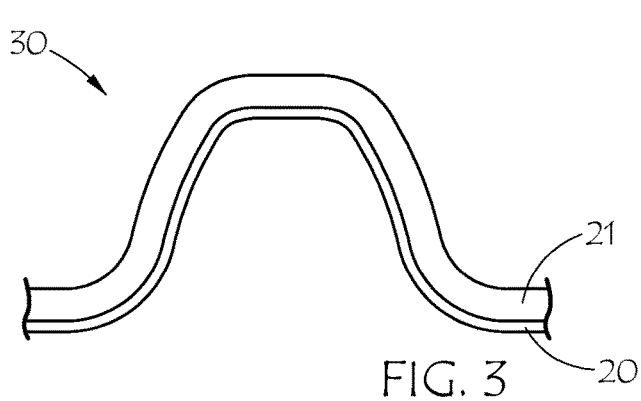
FIG. 3 is a laminated unidirectional fabric useful in the invention.

The unidirectional fabric may be laminated with a rubber material, such as the cushion material 21. FIG. 3 illustrates laminate 30 including fabric 20, with layer of rubber 21, preformed into the general shape of tooth 11.

Figure 4:
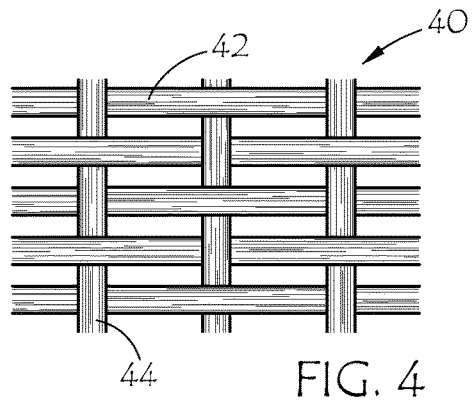
FIG. 4 is a fabric with unidirectional carbon fibers useful in the invention.

FIG. 4 shows a second embodiment of the reinforcing fabric (20 in FIG. 1) which may be suspended in the tooth and follow the tooth contour. Fabric 40 preferably includes unidirectional fibers 42, preferably carbon, woven with other fibers 44. The other fibers 44 may be aramid, glass, polyamide, polyester, acrylic, cotton or other suitable fiber or combinations thereof. While carbon fibers 42 are chosen mainly to provide high strength or modulus in a thin layer in the longitudinal direction, the other fibers 44 may be chosen to provide other functionality, such as better adhesion to the tooth composition, or desired physical properties in the transverse direction, etc. The reinforcing fabric may thus be a hybrid fabric with the longitudinal unidirectional fiber being any suitable fiber type which provides high strength and flexibility, such as carbon fiber, aramid, glass, PBO, polyester, and the like, or combinations thereof. Preferably the unidirectional fiber comprises or consists of glass or aramid, and most preferably carbon fiber. Preferably the areal weight of the longitudinal unidirectional fibers 42 is greater than that of all the other fibers 44.

Examples of suitable unidirectional carbon fabrics include: unidirectional carbon fabric from (or based on carbon fibers from) primary producers such as Toray Industries Inc., Hexcel Corp., Toho Tenax, Mitsubishi Rayon Corporation, and Formosa Plastics. The fibers used may range from 4 to 15 microns in diameter and may come in tow sizes ranging from 3 k to 48 k. Unidirectional fabrics may have an areal weight ranging from about 40 to 1200 g/m$^2$ and a width ranging from 1 cm to 1 m or more. A preferred width is the width of the belt fabrication tooling used. Alternately, a narrower width tape may be helically wound to form a layer the width of the tooling. The unidirectional fabric thickness may be in the range from about 0.05 mm to about 0.4 mm. Suitable fabrics are widely available for the structural composite market, but have not been utilized in or optimized for the power transmission belt market.

The elastomer formulations or compounds utilized for the various rubber layers referred to herein as "rubber" may be based on any known elastomer, including for example, nitrile elastomers, polychloroprene, natural rubber, diene rubbers, polyurethanes, acrylic elastomers, ethylene-α-olefin elastomers, etc. including liquid elastomers, all of which may be crosslinked or vulcanized (thermoset), or thermoplastic elastomers may be used. Preferred elastomers include HNBR, polyurethane, and ethylene-α-olefin elastomers.

The jacket may utilize any known fabric used in belts, including for example, woven, knit or non-woven fabrics of nylon, polyester, acrylic, natural fibers, rayon, aramid, or combinations thereof. The fabric may be a stretch fabric, or a bias-cut woven fabric. The jacket may include one or more treatments known in the art, such a rubber cements, RFLs, or the like, as described above.

The tensile member, or cord, may be of any known tensile cord material used in belts, including for example, fiberglass, carbon fiber, aramid, PBO, polyester, nylon, steel, or hybrids thereof, or the like. The cord may be helically wrapped or wound with a predetermined cord spacing. There may be two cords applied side-by-side, such as an S-twisted cord and a Z-twisted cord.

Belts according to the invention may be best made by the preform method. The jacket may be applied to a grooved mandrel or mold, with the jacket following the general contour of the grooves which are designed to match the desired tooth profile in the synchronous belt. The jacket may be preformed into such contoured shape on a separate mandrel or mold and then placed onto the grooved mandrel or mold, or the preforming of the jacket may be on the grooved mandrel or mold itself. The jacket may be joined into a cylindrical tube before or after applying the jacket to the mandrel. The unidirectional fabric may be preformed likewise so that it fits around the mandrel or mold following the jacket contour. The ends may be overlapped or butt-joined, preferably in a tooth region so as not to affect the belt thickness in the land region. The preforming may include filling the remaining tooth cavity with tooth rubber before applying tensile cord in a helical fashion around the mandrel, with the back rubber applied last. Alternately, the cord may be applied followed by a layer of tooth rubber, in which case the rubber will be forced through the cord during molding in a partial flow-through method.

Examples of preform methods of belt manufacturing are described in U.S. Pat. Nos. 3,250,653, 3,973,894, 4,235,119, 6,406,397, and 9,353,827. The preform method is particularly useful for jackets with limited or no stretch which cannot be shaped by the flow-through method. In this case, though, the preform method is advantageous in that it allows the suspended unidirectional fabric to be placed in the tooth cavities of the preformed jacket before the tensile member and other layers are applied. The jacket and unidirectional fabric may thus be preformed and/or applied to the mold in separate steps, or they may be laminated together and preformed and/or applied to the mold together as a laminate.

After all the materials are applied to the mandrel or mold, they may be cured by applying heat and pressure to form and cure jacket, unidirectional fabric, cord, and rubber into a belt sleeve. The belt sleeve may then be removed from the mold, optionally ground to desired thickness, and cut into individual belts of predetermined width.

This design is intended to improve the fatigue life of the belt, improve the ultimate strength of the belt, and by doing so, allow the belt designer to reduce the required width of the belt while still achieving equivalent performance relative to an existing design. The design is believed to improve the integrity of the tooth-cord, load-transfer interaction. The pre-formed, unidirectional, filament layer may act as a "flexible bridge" during the load transfer from the tooth to the cord. The incidence of "tooth shear" failure may thus be reduced. The tooth-stiffness design range may be extended for a given polymer or elastomeric tooth composition, or with other design factors being equal. A belt designer may be able to design a belt of greater strength by including the unidirectional layer, or alternately, may be able to reduce belt width or other dimensions without sacrificing strength or durability. In a belt drive system, this design flexibility may permit the designer to achieve a reduction in the system maximum belt tension, maximum belt effective tension, and maximum tensioner span tension, preferably with a reduced-width belt. In experimental trials, other system modifications, such as various belt guides and tensioners, were not able to achieve such desirable system results.

As an example of the invention, two toothed belts were made, one without the inventive tooth reinforcement and one with a unidirectional, carbon-fiber-filament, fabric layer. The unidirectional carbon fiber fabric had a weight of about 51 g/m$^2$ (1.5 oz/sq yd). The unidirectional material was treated with an adhesive treatment including a polyelectrolyte, an epoxy, and a curative as described above. The toothed belts included a treated nylon tooth cover, a twisted tensile cord, and a body elastomer based on HNBR rubber. Portions of each belt were subjected to a tooth shear test in which a tooth is placed under shearing force in a tensile testing machine and pulled until it tears from the belt. The peak load during the test is recorded as the tooth shear force. The control belt, without the added unidirectional fabric layer exhibited a tooth shear force of 144 N/mm width, while the inventive belt reinforced with the unidirectional fabric exhibited a tooth shear force of 206 N/mm width. The inventive belt thus exhibited a 43% increase in tooth shear force over the control belt.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A synchronous belt comprising:
   a tensile member layer having a tensile member embedded in an elastomeric body;
   a toothed surface comprising a plurality of regularly spaced, transverse teeth protruding from the body;
   a jacket covering the toothed surface; and
   a unidirectional fabric layer suspended in the belt between the jacket and the tensile member layer and following the approximate contour of the jacket.

2. The synchronous belt of claim 1 further comprising a cushion layer of elastomeric material residing between said jacket and said unidirectional fabric layer.

3. The synchronous belt of claim 2 wherein said unidirectional fabric layer comprises unidirectional filaments of carbon fiber.

4. The synchronous belt of claim 1 wherein the unidirectional fabric is treated with an adhesive composition.

5. The synchronous belt of claim 4 wherein the adhesive composition comprises a primer material, a polyelectrolyte, and a curative.

6. A synchronous belt comprising:
   a tensile member layer having a tensile member embedded in an elastomeric body;
   a toothed surface comprising a plurality of regularly spaced, transverse teeth protruding from the body;
   a jacket covering the toothed surface; and
   a fabric comprising unidirectional carbon fibers suspended in the belt between the jacket and the tensile member layer and with said carbon fibers following the approximate contour of the jacket oriented generally in the longitudinal direction of the belt.

7. A method of making a synchronous belt comprising:
   preforming a jacket to fit a grooved mold having grooves matching a desired tooth profile for said belt;
   preforming a unidirectional fabric to fit the form of said preformed jacket;
   applying said preformed jacket and unidirectional fabric to said mold;
   helically winding a tensile cord around said mold over said jacket and unidirectional fabric;
   applying a rubber layer over said tensile cord around said mold;
   applying heat and pressure to form and cure said jacket, fabric, cord, and rubber layer into a belt sleeve;
   cutting said belt sleeve to form individual belts of predetermined width.

* * * * *